(12) United States Patent
Richards et al.

(10) Patent No.: US 11,796,905 B2
(45) Date of Patent: Oct. 24, 2023

(54) MOIRE REDUCTION WITH CONTROLLED PERFORATION LOCATION

(71) Applicant: Dolby Laboratories Licensing Corporation, San Francisco, CA (US)

(72) Inventors: Martin J. Richards, Gig Harbor, WA (US); Barret Lippey, Foster City, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 18/040,528

(22) PCT Filed: Aug. 11, 2021

(86) PCT No.: PCT/US2021/045619
§ 371 (c)(1),
(2) Date: Feb. 3, 2023

(87) PCT Pub. No.: WO2022/036012
PCT Pub. Date: Feb. 17, 2022

(65) Prior Publication Data
US 2023/0236492 A1  Jul. 27, 2023

Related U.S. Application Data

(60) Provisional application No. 63/064,517, filed on Aug. 12, 2020.

(30) Foreign Application Priority Data

Aug. 12, 2020 (EP) ..................................... 20190641

(51) Int. Cl.
*G03B 21/56* (2006.01)
*G03B 21/60* (2014.01)

(52) U.S. Cl.
CPC ........... *G03B 21/565* (2013.01); *G03B 21/60* (2013.01)

(58) Field of Classification Search
CPC .............................. G03B 21/56; G03B 21/60
(Continued)

(56) References Cited

U.S. PATENT DOCUMENTS 1,810,168 A * 6/1931 Gray .................... G03B 21/602
427/163.3
1,856,739 A * 5/1932 Alt ...................... B29C 65/5042
156/304.4
(Continued)

FOREIGN PATENT DOCUMENTS

CN 116057469 A * 5/2023
JP 2007504486 A * 3/2007 ............. G03B 21/56
(Continued)

OTHER PUBLICATIONS

Zhang et al., 3D-TV Content Creation: Automatic 2D-to-3D Video Conversion, IEEE Transactions on Broadcasting, 2011 pg(s) 13 (Year: 2011).*

(Continued)

*Primary Examiner* — Stephanie E Bloss
*Assistant Examiner* — Kevin C Butler

(57) ABSTRACT

One or more perforation hole pattern methods are applied (402) to generate a spatial distribution of perforation holes forming a semi-random pattern for an image display screen. The image display screen is perforated (404) with the spatial distribution of perforation holes forming the semi-random pattern. Image rendering light is emitted (406) with a light projector toward the image display screen that is installed in an image rendering environment. At least a portion of the image rendering light emitted from the light projector is reflected (408) by the image display screen, toward a viewer.

18 Claims, 10 Drawing Sheets

(58) Field of Classification Search
USPC .................................. 359/445; 181/30, 352
See application file for complete search history.

(56) References Cited

U.S. PATENT DOCUMENTS

| | | | | |
|---|---|---|---|---|
| 2,151,236 A * | 3/1939 | Schwartz | G03B 21/625 | 359/453 |
| 2,216,901 A * | 10/1940 | Bodde | G03B 21/565 | 359/445 |
| 2,245,896 A * | 6/1941 | Bodde | G03B 21/565 | 264/309 |
| 2,448,560 A * | 9/1948 | Walker | G03B 21/60 | 427/163.3 |
| 2,800,097 A * | 7/1957 | Yorick | G03B 21/58 | 112/122 |
| 2,813,054 A * | 11/1957 | Nicholas | B29C 66/836 | 156/701 |
| 2,974,566 A * | 3/1961 | Hurley | B29C 65/342 | 156/92 |
| 3,237,517 A * | 3/1966 | Komitor | G03B 21/56 | 359/451 |
| 3,263,561 A * | 8/1966 | Jackson | G03B 21/602 | 359/451 |
| 3,265,154 A * | 8/1966 | March | E04B 1/86 | 181/290 |
| 3,692,384 A * | 9/1972 | Kimura | G03B 21/56 | 359/451 |
| 3,712,846 A * | 1/1973 | Daniels et al. | E04B 1/86 | 428/401 |
| 4,146,661 A * | 3/1979 | Grandel | G03D 15/043 | 428/137 |
| 4,566,042 A * | 1/1986 | Cahill | H04N 1/4058 | 358/3.02 |
| 4,840,829 A * | 6/1989 | Suzuki | D04H 1/495 | 428/131 |
| 4,916,545 A * | 4/1990 | Granger | H04N 1/4058 | 358/3.09 |
| 5,011,263 A * | 4/1991 | Hopper | G03B 21/56 | 359/450 |
| 5,140,460 A * | 8/1992 | Fukuhara | H04R 1/345 | 359/445 |
| 5,258,870 A * | 11/1993 | Tai | G03B 21/565 | 359/445 |
| 5,473,454 A * | 12/1995 | Blanchard | G02B 5/0278 | 359/452 |
| 6,322,657 B1 * | 11/2001 | Pontuti | B29C 65/4815 | 40/604 |
| 6,698,901 B2 * | 3/2004 | Kobayashi | G03B 21/56 | 353/94 |
| 6,822,389 B2 * | 11/2004 | Kwasnick | H10K 59/18 | 313/506 |
| 7,187,474 B1 * | 3/2007 | Chen | G09G 3/2055 | 358/3.21 |
| 7,688,347 B2 * | 3/2010 | Dolgoff | H04N 9/317 | 359/619 |
| 8,072,681 B2 * | 12/2011 | Coleman | G03B 35/16 | 359/459 |
| 8,144,399 B2 * | 3/2012 | Steenblik | B42D 25/425 | 359/618 |
| 9,121,577 B2 * | 9/2015 | Hajjar | H04N 9/3129 | |
| 10,311,276 B2 * | 6/2019 | Mackey | G06V 40/1318 | |
| 10,379,370 B2 * | 8/2019 | Bell | G02B 30/52 | |
| 10,506,315 B1 * | 12/2019 | Chapman | H04R 1/023 | |
| 11,423,853 B1 * | 8/2022 | Marks | G09G 3/20 | |
| 2002/0048438 A1 * | 4/2002 | Veligdan | G09F 9/30 | 348/E5.144 |
| 2002/0131018 A1 * | 9/2002 | Lucas | G03B 21/56 | 352/85 |
| 2006/0274413 A1 * | 12/2006 | Hopper | G03B 21/56 | 359/451 |
| 2007/0121167 A1 * | 5/2007 | Chen | G09G 3/2055 | 358/3.2 |
| 2008/0211972 A1 * | 9/2008 | Congard | G03B 21/56 | 348/744 |
| 2009/0190210 A1 * | 7/2009 | Coleman | F16H 21/14 | 359/452 |
| 2009/0297797 A1 * | 12/2009 | Coleman | G02B 30/25 | 156/71 |
| 2011/0149389 A1 * | 6/2011 | Sharp | B29D 11/0074 | 427/163.3 |
| 2012/0229894 A1 * | 9/2012 | Coleman | G03B 21/604 | 359/443 |
| 2012/0262784 A1 * | 10/2012 | Saito | G03B 21/602 | 264/156 |
| 2013/0017371 A1 * | 1/2013 | Kondo | G03B 21/56 | 428/189 |
| 2013/0233641 A1 * | 9/2013 | Sharp | G03B 21/60 | 181/175 |
| 2017/0371173 A1 * | 12/2017 | Bietry | G02B 26/0891 | |
| 2018/0297341 A1 * | 10/2018 | Ueki | G02B 5/30 | |
| 2021/0141238 A1 * | 5/2021 | Pertierra | H04N 9/3102 | |

FOREIGN PATENT DOCUMENTS

| | | | | |
|---|---|---|---|---|
| KR | 101886840 B1 * | 9/2016 | | G03B 21/56 |
| WO | 2018065955 A2 | 4/2018 | | |
| WO | WO-2022036012 A1 * | 2/2022 | | |

OTHER PUBLICATIONS

Sun et al., An overview of free viewpoint Depth-Image-Based Rendering (DIBR), Proceedings of the Second APSIPA Annual Summit and Conference, pp. 1023-1030, Biopolis, Singapore, Dec. 14-17, 2010 (Year: 2010).*

Kauff et al., Depth map creation and image-based rendering for advanced 3DTV services providing interoperability and scalability, Signal Processing: Image Communication 22 (2007) 217-234 (Year: 2007).*

Fehn et al., Depth-image-based rendering (DIBR), compression, and transmission for a new approach on 3D-TV, Proc. SPIE 5291, Stereoscopic Displays and Virtual Reality Systems XI, (May 21, 2004); doi: 10.1117/12.524762 (Year: 2004).*

Bartczak et al., Display-Independent 3D-TV Production and Delivery Using the Layered Depth Video Format, IEEE Transactions on Broadcasting, vol. 57, No. 2, Jun. 2011 (Year: 2011).*

Marek Domański et al., Immersive visual media—MPEG-I: 360 video, virtual navigation and beyond, IEEE, © 2017 IEEE. (Year: 2017).*

Anderson et al, Jump: Virtual Reality Video, ACM Trans. Graph., vol. 35, No. 6, Article 198, Publication Date: Nov. 2016, pp. 13 (Year: 2016).*

Jens-Rainer Multimedia Content, Signal Composition, Rendering and Presentation 7.2 Mosaicking and stitching, Springer, 2016, pp. 333-341 (Year: 2016).*

Devernay et al., Stereoscopic Cinema, Springer, Image and Geometry: Processing for 3-D Cinematography, vol. 5 of Geometry and Computing, Springer, Jun. 19, 2015, pp. 41 (Year: 2015).*

* cited by examiner

```
┌─────────────────────────────────────────────┐
│ apply perforation hole pattern methods to generate │
│      a semi-random pattern for a screen 402 │
└─────────────────────────────────────────────┘
                       │
┌─────────────────────────────────────────────┐
│  perforate the image display screen with the │
│         semi-random pattern 404             │
└─────────────────────────────────────────────┘
                       │
┌─────────────────────────────────────────────┐
│  emit image rendering light toward the screen 406 │
└─────────────────────────────────────────────┘
                       │
┌─────────────────────────────────────────────┐
│  reflect, by the screen, the image rendering toward │
│              a viewer 408                    │
└─────────────────────────────────────────────┘
```

*FIG. 4*

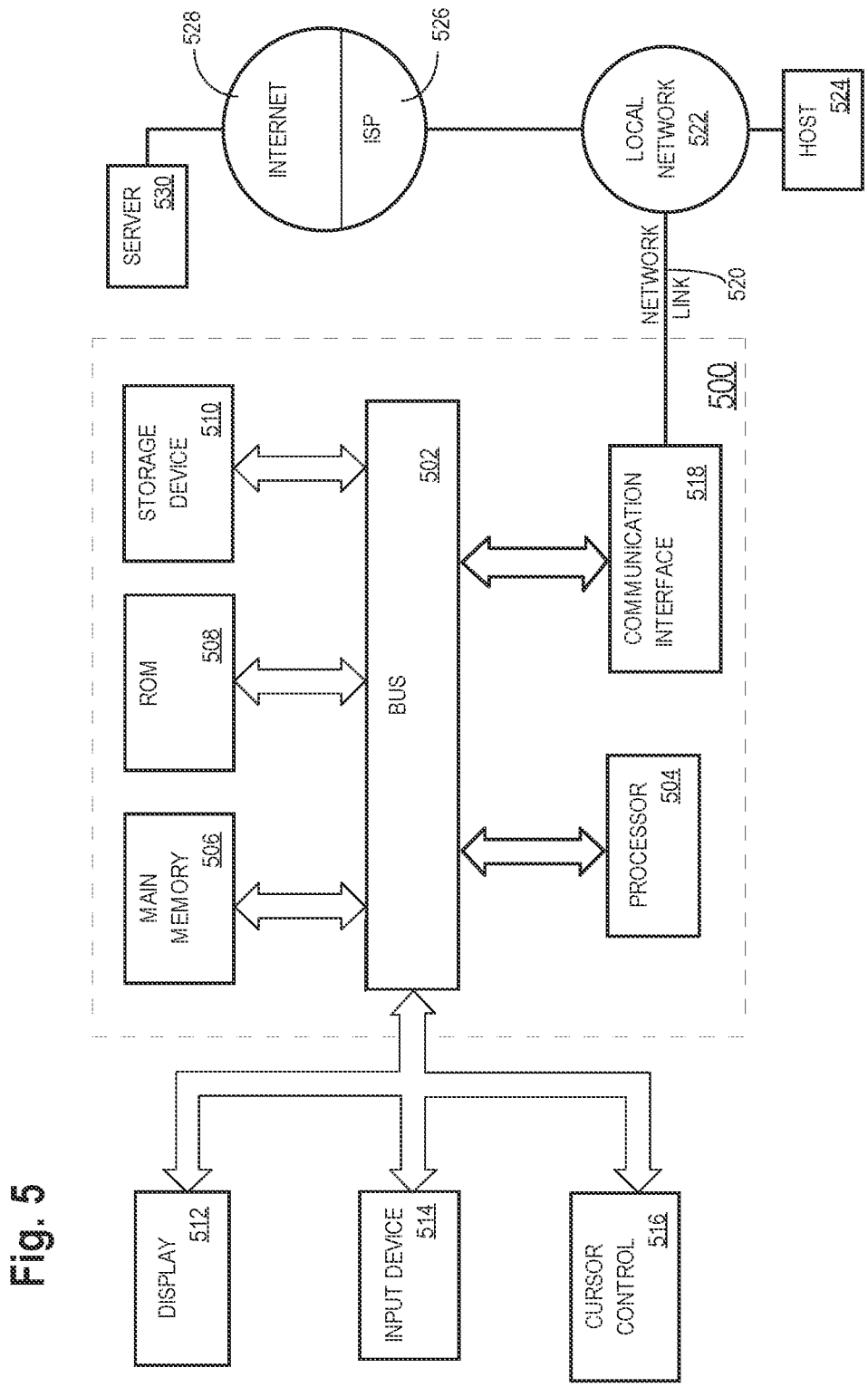

MOIRE REDUCTION WITH CONTROLLED PERFORATION LOCATION

CROSS-REFERENCE TO RELATED APPLICATIONS

This application is the U.S. national stage entry of International Patent Application No. PCT/US2021/045619, filed on Aug. 11, 2021, which claims priority of U.S. Provisional Patent Application No. 63/064,517, filed Aug. 12, 2020, and European Patent Application No. 20190641.9, filed Aug. 12, 2020, both of which are incorporated herein by reference in their entirety.

TECHNOLOGY

The present invention relates generally to image displays, and in particular, to Moire reduction with controlled perforation location in image displays or screens.

BACKGROUND

Screens in digital cinema installations have regular patterned perforations that allow sound waves from audio speakers behind the screens to pass through toward viewers. In such a cinema installation, light that renders images may be emitted from a digital cinema projector (or any digital projector), projected onto such a screen, and reflected from the screen toward the viewers. The light as emitted from the projector onto the screen is modulated by a spatial distribution pattern of amplitude variations of reflectivity of the screen. These amplitude variations are at least in part impacted or influenced by presence of the perforations on the screen. When the perforations on the screen and visual expressions of pixels from the projected images have spatial frequencies forming rational relationships, visually perceptible beats of lower spatial frequencies may occur and become quite noticeable. (A rational relationship is formed between a spatial frequency of a pixel pattern and a spatial frequency of a perforation pattern if a ratio of the two spatial frequencies can be represented as a ratio of two integer numbers.) This type of visual artifact, known as Moire pattern, is not depicted or intended to be depicted by content creators in the images but rather is induced by certain relationships and interactions between spatial frequencies or variations of the perforation pattern and spatial frequencies or variations of image features or textures in the images.

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4 illustrates example process flows; and

FIG. 5 illustrates an example hardware platform on which a computer or a computing device as described herein may be implemented.

DESCRIPTION OF EXAMPLE EMBODIMENTS

Figure 1A:
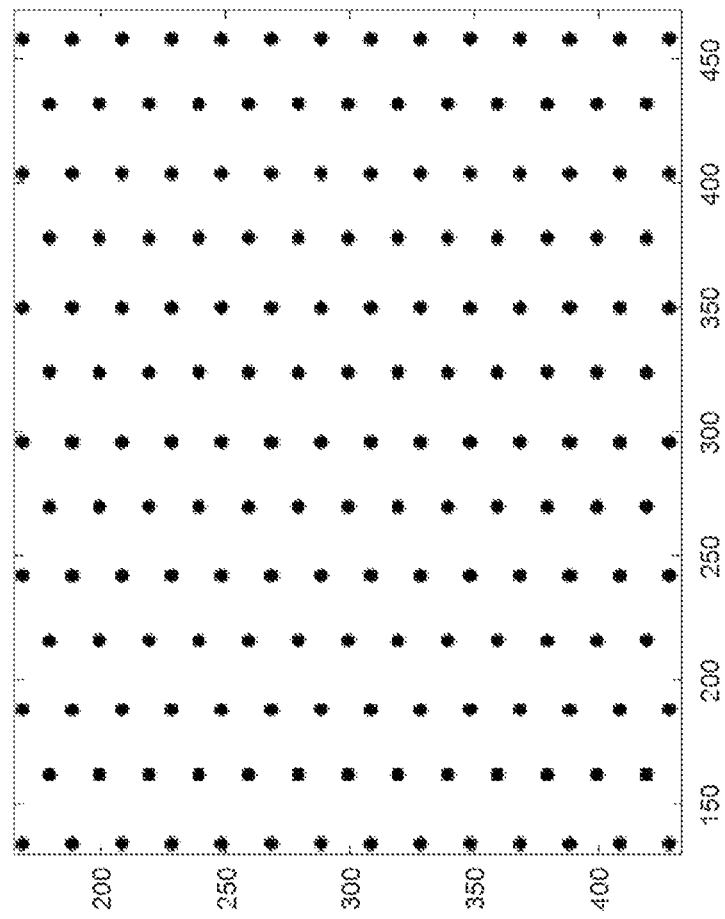
FIG. 1A illustrates an example modified fixed perforation pattern.

Example embodiments, which relate to Moire reduction with controlled perforation location, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. REGULAR PERFORATION PATTERNS
3. SEMI-RANDOM PERFORATION PATTERNS
4. SYSTEM CONFIGURATION
5. EXAMPLE PROCESS FLOWS
6. IMPLEMENTATION MECHANISMS—HARDWARE OVERVIEW
7 EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Under techniques as described herein, perforation locations on a screen or image display may be generated in a semi-random pattern such that Moire patterns are reduced or eliminated. Perforation holes punched or made on the screen in these locations allow sound (waves) generated by (audio) speakers behind the screen to propagate relative freely to viewers/audience. The screen may be installed in a cinema, movie theatre, entertainment venue, amusement park, and so on, where Moire is a significant problem.

In some operational scenarios, halftone techniques may be used to produce or generate perforation locations in a semi-random pattern that is spatially random but with no or little low frequency pattern that could be visually observable on a screen as non-uniformity on the screen. These techniques can provide uniformity in perforation hole distribution, reduce or avoid Moire patterns to be generated in image rendering operations, while maintaining needed perforation density and area for the sound to pass from behind the screen.

In some operational scenarios, noise generation/injection techniques may be used to modify a regular perforation pattern such as the commercially available Digital Perforation or standard perforation pattern such that the resultant perforation locations do not form a regular grid prone to inducing Moire patterns. Additionally, optionally or alternatively, filtering may be applied to generate high pass filtered spatial random or semi-random noise (e.g., with a uniform amplitude distribution, etc.) that can be added to x and y locations of grid points or vertexes of the regular perforation grid.

A selected amount of high pass filtered noise may be implemented to reduce or prevent non-uniformity of the resultant semi-random pattern visible on the screen for viewers at or beyond a designated distance, taking into account that visual features in a rendered image on the screen are further low pass filtered by the Human Visual System at or beyond the designated distance. Additionally, optionally or alternatively, the selected amount of noise can be set to be significantly less than the perforation pitch of the regular perforation grid, for example to avoid placing perforation locations at an edge of a web used to form the screen.

Perforation locations as described herein may be derived based upon an (existing logical but not physically visible) reference perforation grid on a screen made of one or more screen material webs (e.g., cut from rolls of screen materials, etc.). Cuts and joins of screen material webs to form the screen can be carried out in reference to the original grid point locations in the reference perforation grid without introducing DC shifts impacting the uniformity of the reference perforation grid logically imposed onto the screen. Thus, the screen material webs can be seamed, stitched and/or welded in reference to the reference perforation grid without generating visible artifacts caused by DC shifts in the resultant screen.

Furthermore, semi-random perforation location generation techniques such as noise generation/injection techniques, halftone techniques, etc., may be modified and/or combined to reduce the amplitude of noises or spatial displacements from regular grid points or vertexes, as one approaches edges of webs. Thus, the locations of the perforations can trend or simply cutover to the original regular perforation pattern toward the edges of the webs to avoid creating visible artifacts around the edges of webs such as half perforations, visible misalignments, and so on.

Example embodiments described herein relate to image display systems. An image display system comprising: an image display screen that comprises a spatial distribution of perforation holes forming a semi-random pattern; a light projector that emits image rendering light toward the image display screen. The image display screen reflects at least a portion of the image rendering light emitted from the light projector toward a viewer.

Example embodiments described herein relate to image display systems. One or more perforation hole pattern methods are applied to generate a spatial distribution of perforation holes forming a semi-random pattern for an image display screen. The image display screen is perforated with the spatial distribution of perforation holes forming the semi-random pattern. Image rendering light is emitted, by a light projector, toward the image display screen that is installed in an image rendering environment. At least a portion of the image rendering light emitted from the light projector is reflected, by the image display screen, toward a viewer.

Example embodiments described herein relate to image display screen configured to reflect at least a portion of image rendering light emitted from a light projector toward a viewer, the image display screen comprising a spatial distribution of perforation holes forming a semi-random pattern to reduce Moire patterns in image rendering operations.

In an embodiment, the image display screen comprises a plurality of webs that are joined along one or more seam edges. In an embodiment, the spatial distribution of perforation holes on the image display screen trends to or cuts over from the semi-random perforation pattern to a regular perforation pattern toward the one or more seam edges.

Example embodiments described herein relate to a method of manufacturing an image display screen, comprising: applying one or more perforation hole pattern methods to generate a spatial distribution of perforation holes forming a semi-random pattern for the image display screen to reduce Moire patterns in image rendering operations; perforating the image display screen with the spatial distribution of perforation holes forming the semi-random pattern; and providing a plurality of webs that are joined along one or more seam edges of the image display screen. The spatial distribution of perforation holes on the image display screen trends or cuts over from the semi-random pattern to a regular perforation pattern toward the one or more seam edges.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Regular Perforation Patterns

Strength and visibility of Moire patterns generated from interaction between perforations on a screen and visual expressions of pixels in an image projected from a projector onto and reflected from the screen is dependent upon relative spacings of a pixel pattern of the pixels from the projector and a perforation pattern of the perforations, size of the perforations, (e.g., luminance, chrominance, etc.) amplitude of the pixel pattern from the projector. The worst Moire pattern can occur as a result of the perforation pattern with a spatial pitch forming a rational relationship to a spatial pitch of the pixel pattern. For example, a visually noticeable beat or Moire pattern is prone to occur when the perforation pattern is of a spatial pitch similar to or a multiple of a spatial pitch of the pixel pattern.

A method for reducing or preventing Moire patterns may be referred to as a de-Moire method. One example de-Moire method is to defocus projection lens in a projector. This method could work to reduce the Moire pattern but at the risk of unnecessarily reducing the overall resolution of the image. When the lens is defocused, the lens' modulation transfer function (MTF) can be significantly changed in a device or design dependent/sensitive manner. While one would expect de focus to only affect relatively high spatial frequencies (e.g., in or toward an upper part of a full spatial frequencies perceivable by human vision, etc.), it can also affect relatively low spatial frequencies (e.g., in or toward a lower part of the full spatial frequencies perceivable by human vision, etc.), depending upon the projection lens design. For example, relatively low spatial frequencies in visual expressions of pixels in the projected image may sometimes be affected by such a de-Moire method.

In practice, it may be difficult to achieve a proper amount of defocusing in a projection lens while also attempting to strike a balance between de-Moire and defocusing. A cinema or theater may be operated by multiple maintenance technicians. Refocusing or defocusing projection lens may be one of the first things performed by a maintenance technician coming in to perform operational duty of the cinema or theatre. The technician may not be familiar with the Moire pattern problem, previous adjustments used to reduce the problem, or effects of the previous adjustments on the Moire pattern problem and projected image resolution. Thus, it is unlikely for the technician to determine whether a proper amount of refocusing or defocusing has already performed or is to be performed. It is also unlikely for the technician to determine whether performed or to-be-performed refocusing or defocusing serves to reduce or exacerbate the Moire pattern problem.

Another example de-Moire method is to use a modified fixed perforation pattern, such as the Digital Perforation pattern (e.g., Harkness, etc.), to reduce the Moire pattern.

FIG. 1A illustrates an example modified fixed perforation pattern represented in a two-dimensional space with vertical and horizontal spatial dimensions. The modified perforation pattern comprises a two-dimensional array of perforations each of which is represented by a solid black circle in FIG. 1A. Different from a standard square or rectangular perforation pattern, the modified perforation pattern has alternate (perforation) rows with a ½ perforation spatial offset compared with neighboring (perforation) rows. Likewise, the modified perforation pattern has alternative (perforation) columns with a ½ perforation spatial offset compared with neighboring (perforation) columns. The ½ perforation spatial offset used for alternating (perforation) rows may, but is not required to, be different from the ½ perforation spatial offset used for alternating (perforation) columns.

Figure 1B:
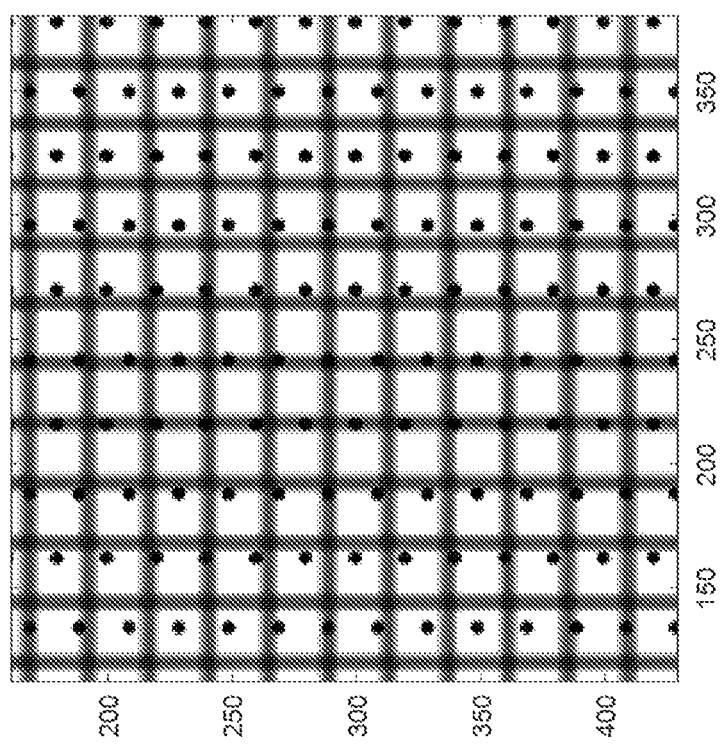
FIG. 1B illustrates an example square pixel pattern superimposed with a modified fixed perforation pattern.

FIG. 1B illustrates an example square pixel pattern superimposed with a modified fixed perforation pattern (e.g., in FIG. 1A, etc.). The square pixel pattern comprises a two-dimensional array of pixels each of which is represented by a white square in the square pixel pattern FIG. 1B. Perforations (solid black circles in FIG. 1B—which may be the same as those in FIG. 1A) along a (perforation) column in the modified perforation pattern have varying spatial offset in relation to pixels—e.g., white squares in which the perforations are embedded or at least partly overlapped—along a corresponding pixel column in the pixel pattern. Likewise, perforations (solid black circles) along a (perforation) row in the modified perforation pattern has varying spatial offset in relation to pixels—e.g., white squares in which the perforations are embedded or at least partly overlapped—along a corresponding pixel row in the pixel pattern.

Figure 1C:
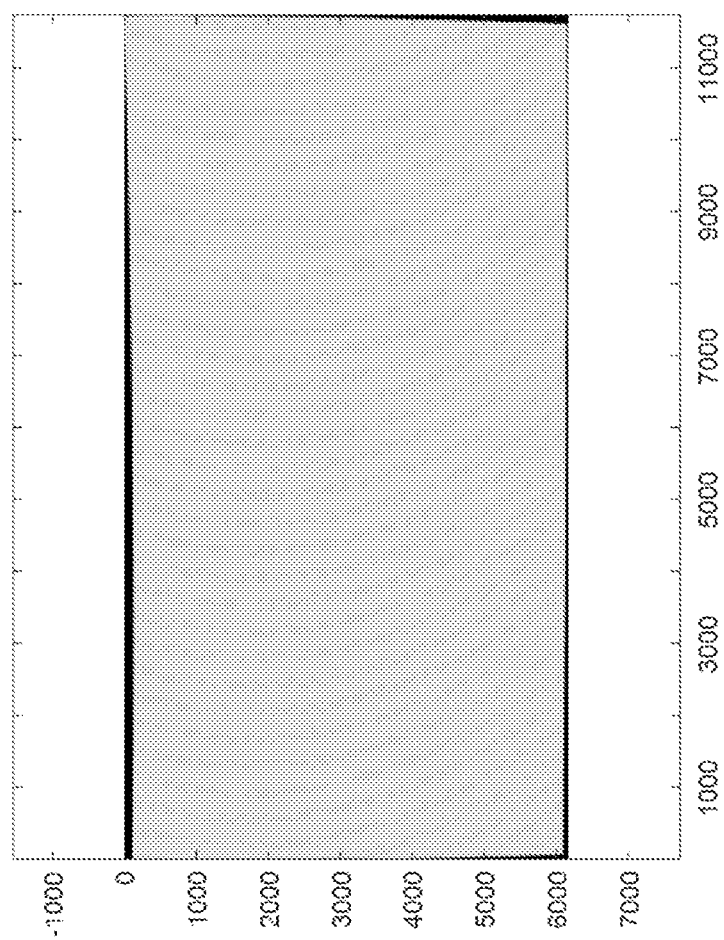
FIG. 1C illustrates an example Moire pattern that may be generated with a pixel pattern such as illustrated in FIG. 1B.

A modified fixed perforation pattern such as illustrated in FIG. 1A and FIG. 1B can (still) be prone to generating Moire patterns. FIG. 1C illustrates an example Moire pattern that may be generated when visual expressions of pixels in a pixel pattern such as illustrated in FIG. 1B comprises spatial frequencies that are of a rational relationship with spatial frequencies of the modified fixed perforation pattern. The Moire pattern as illustrated in FIG. 1C may be especially pronounced or the worst when the spatial frequencies of the pixel pattern or visual expressions of pixels and the spatial frequencies of the perforation pattern of FIG. 1A or FIG. 1B are similar or multiples of each other.

As used herein, a visual expression of a pixel may refer to colors, luminance, and/or chrominance of the pixel as rendered on the screen. The visual expression of the pixel may be set based on a pixel value of the pixel received in image data in movie/image/video display operations.

While improving over a standard square or rectangular perforation pattern, the modified fixed perforation pattern is unlikely to sufficiently lessen or eliminate the Moire pattern problem, for example in cinemas, movie theatres or the like.

3. Semi-Random Perforation Patterns

Under techniques as described herein, perforation locations on a screen or image display (e.g., image display, 60-feet cinema screen, etc.) can be generated or implemented in a semi random fashion such that a Moire pattern is not produced or is minimized on the screen in image rendering operations.

Figure 2A:
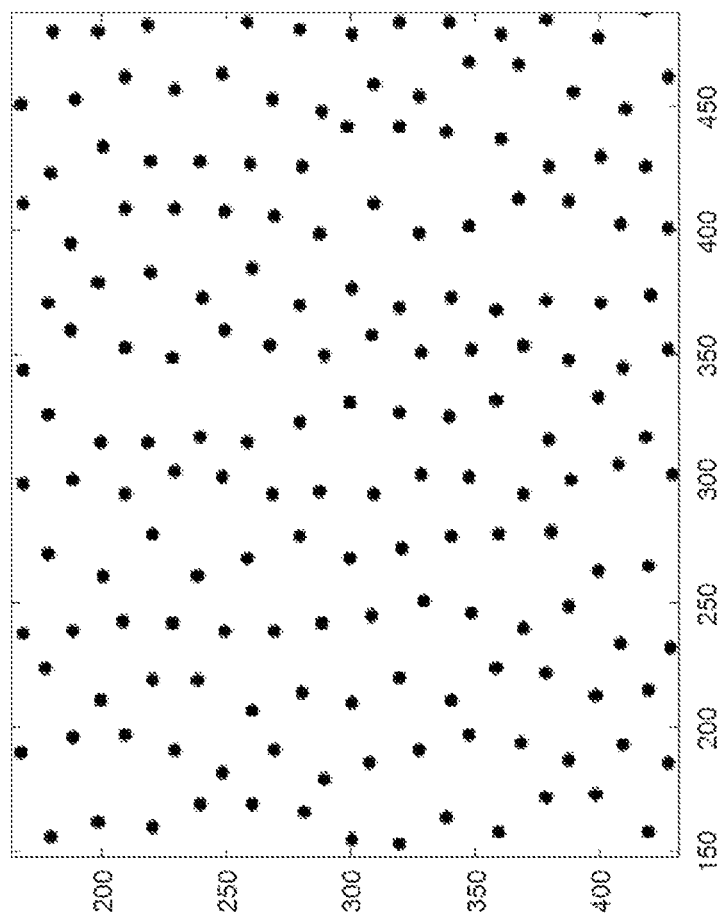
FIG. 2A illustrates an example semi-random perforation pattern.

FIG. 2A illustrates an example semi-random perforation pattern for perforation holes made on a screen or image display represented in a two-dimensional space with vertical and horizontal spatial dimensions. The semi-random perforation pattern comprises a two-dimensional (semi-random) spatial distribution of perforations each of which is logically represented by a solid black circle of FIG. 2A. A perforation hole as described herein as actually drilled or implemented on a screen may be of any in a variety of closed shapes including but not limited to circular shapes, oblong shapes, polygon shapes, irregular shapes, etc. In some operational scenarios, a perforation hole may be circular in shape and of a specific dimension, size or diameter that is selected to be below the spatial resolution (or angular resolution) of a (human) viewer beyond a specific viewing distance in a venue. Image display operations in the venue are performed with one or more projectors to project 2D or 3D images onto the screen or image display, which reflect at least a portion of the incident light toward viewers for the purpose of rendering images visible to the viewers.

Different from perforation patterns (e.g., standard square/ rectangle perforation pattern, modified perforation pattern, etc.) under other approaches, the semi-random perforation pattern of FIG. 2A comprises perforation holes with no visually discernible regular pattern (e.g., crosshatch pattern, etc.) and nonetheless appears uniform to a (human) viewer of a sufficiently far distance.

As used herein, "uniform" may refer to a perforation hole density on the screen being uniform (e.g., within a tolerance of 0.1%, 1%, 2% or another percentile, etc.). Additionally, optionally or alternatively, "uniform" may refer to the total number of perforation holes per unit area of the screen being uniform. Here, a unit area used to measure uniformity may be: comparable to an area distinguishable by human eyes (e.g., as represented with the Human Visual System or HVS, etc.); smaller than an area distinguishable by human eyes; etc.

A regular pattern as described herein may refer to a pattern formed through repetition of constant spatial offsets. Example regular patterns may include, but are not necessarily limited to only, any of: crosshatch patterns, square or rectangular patterns, matrix patterns, diagonal patterns, concentric patterns, combinations of regular patterns with or without offsets, and so forth.

A visually discernible regular pattern may refer to a regular pattern (or a regular pattern portion) that is of a (pattern) size, dimension and/or regularity of repetitions visibly discernible within the spatial resolution capability (e.g., in retina vision, in foveal vision, etc.) of the Human Visual System.

Figure 2B:
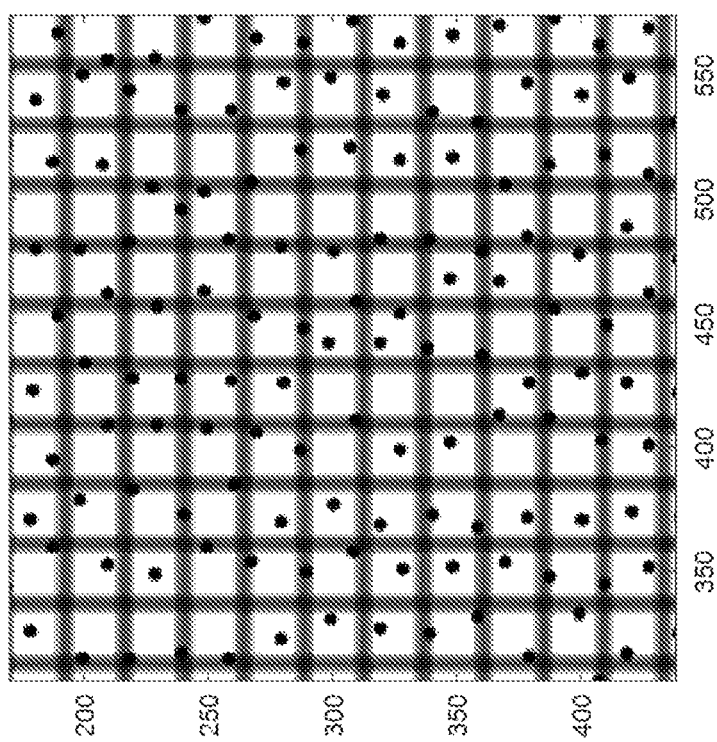
FIG. 2B illustrates an example square pixel pattern superimposed with a semi-random perforation pattern.

FIG. 2B illustrates an example square pixel pattern superimposed with a semi-random perforation pattern (e.g., in FIG. 2A, etc.). As previously noted, the square pixel pattern comprises a two-dimensional array of pixels each of which is represented by a white square in the square pixel pattern. Perforations (solid black circles) in the semi-random perforation pattern has varying individual spatial displacements in relation to pixels—e.g., white squares in which the perforations are embedded or at least partly overlapped—in the pixel pattern.

Figure 2C:
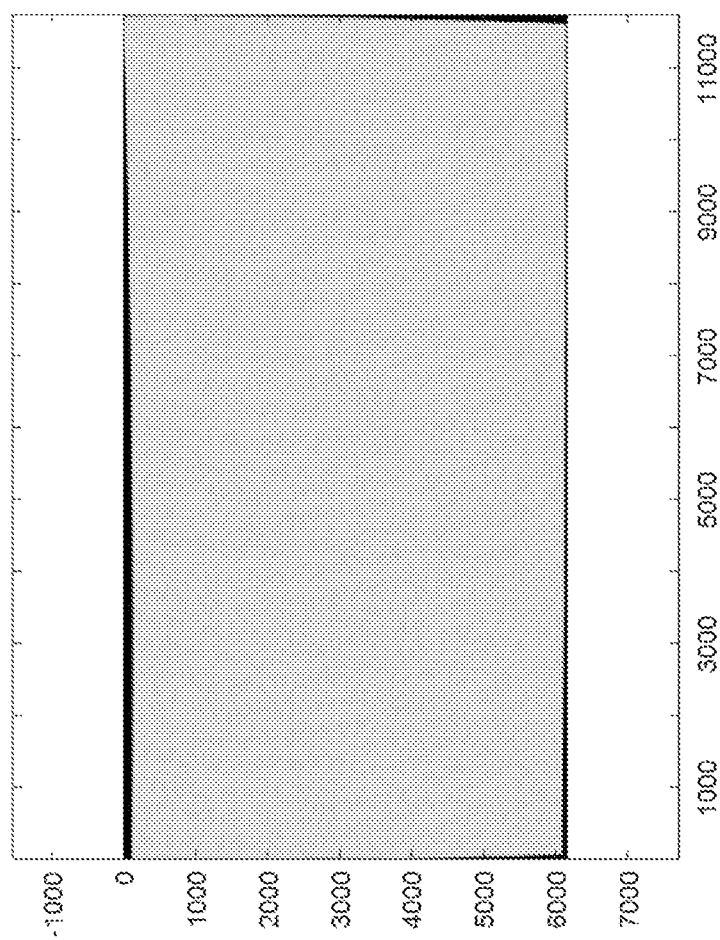
FIG. 2C illustrates an example Moire pattern that may be generated with a pixel pattern such as illustrated in FIG. 2B.

A semi-random perforation pattern such as illustrated in FIG. 2A and FIG. 2B may be used to eliminate or greatly reduce visual artifacts relating to Moire patterns. FIG. 2C illustrates an example (worst case) Moire pattern that may be generated when visual expressions of pixels in a pixel pattern such as illustrated in FIG. 2B. Rational relationships that induce Moire patterns are difficult to form to a sufficiently significant extent between spatial frequencies in visual expressions of a pixel pattern and spatial frequencies of the semi-random perforation pattern to generate visual artifacts relating to the Moire pattern given that perforation holes in the semi-random perforation pattern are distributed irregularly or visually random. As a result, the Moire pattern as illustrated in FIG. 2C may be absent or much less severe than that of FIG. 1C and thus may be invisible to or much less visually noticed by viewers in actual image rendering operations.

One or more perforation location generation methods may be used individually or in combination by a system as described herein to generate perforation locations of a semi-random pattern on a screen or image display. In some operational scenarios, a perforation location generation method may be a halftone method implementing any combination of one or more halftoning techniques including but not limited to: dithering techniques, void-and-cluster techniques, tessellation techniques, stochastic screening, direct binary search (DBS) techniques, error diffusion techniques, frequency modulated (FM) techniques, etc.

4. System Configuration

Figure 3A:
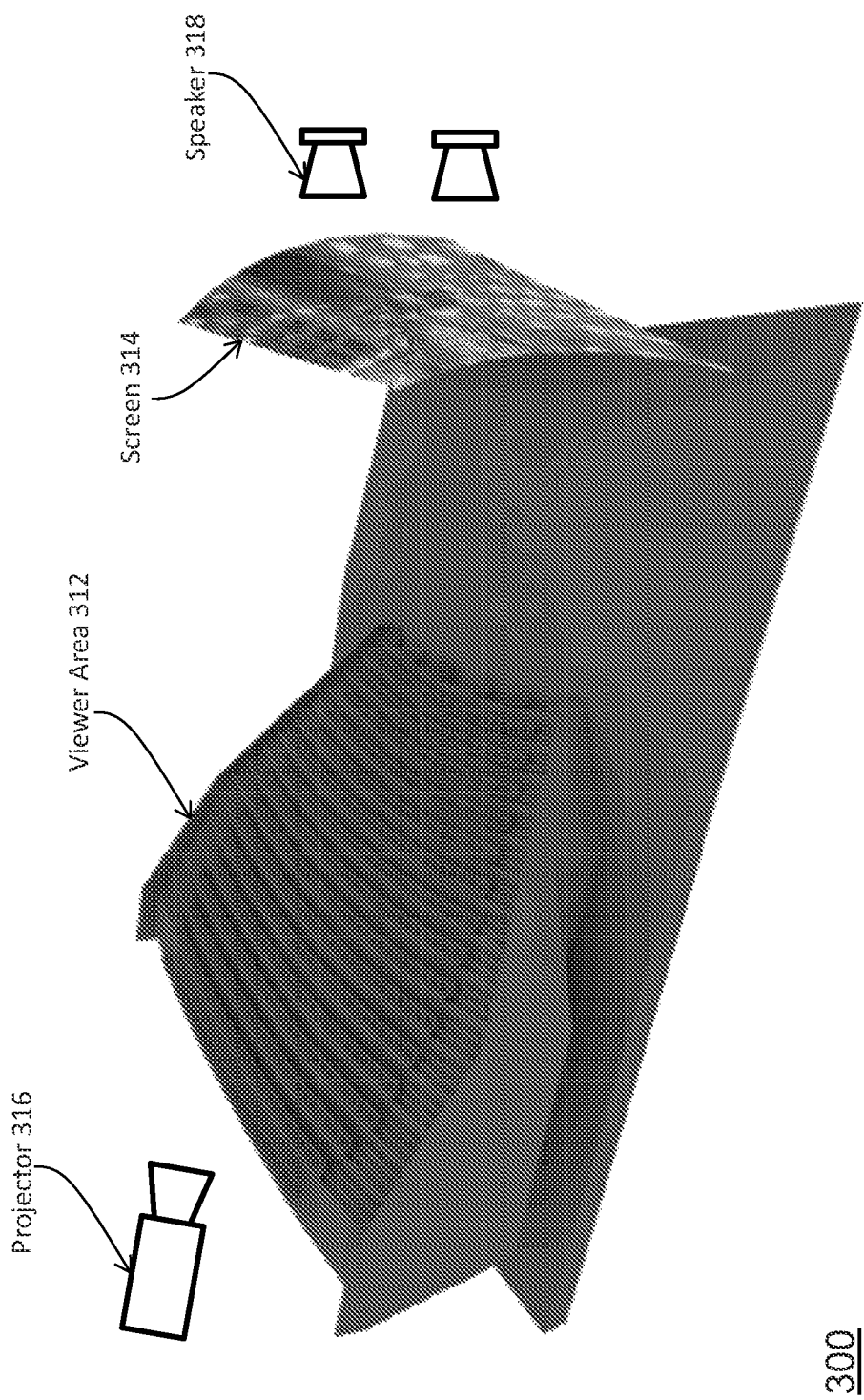
FIG. 3A illustrates an example cinema.

FIG. 3A illustrates an example cinema 300. Two-dimensional and/or three-dimensional image/video content may be rendered with one or more projectors (e.g., 316, digital laser projector or DLP, etc.) deployed in the cinema (300). A projector (e.g., 316, etc.) as described herein may comprise light engine, prism, optics, digital micromirror device or DMD, etc., to generate and project light onto a screen (e.g., an image display, etc.) 314. The projected light from the projector (316) is reflected off from the screen (314) toward one or more viewers in a viewer area (e.g., an audience area, a seated area, a designated area, etc.) 312. One or more speakers 318 may be placed or located behind the screen (314). These speakers (318) emit sounds that depict sounds from audio sources (e.g., characters, instruments, objects, etc.) located within, within and/or outside a visual scene depicted in the images rendered by the projected light from the projector (316) onto the screen (314). The screen (314) may be made of a single web or multiple webs in various embodiments.

Figure 3B:
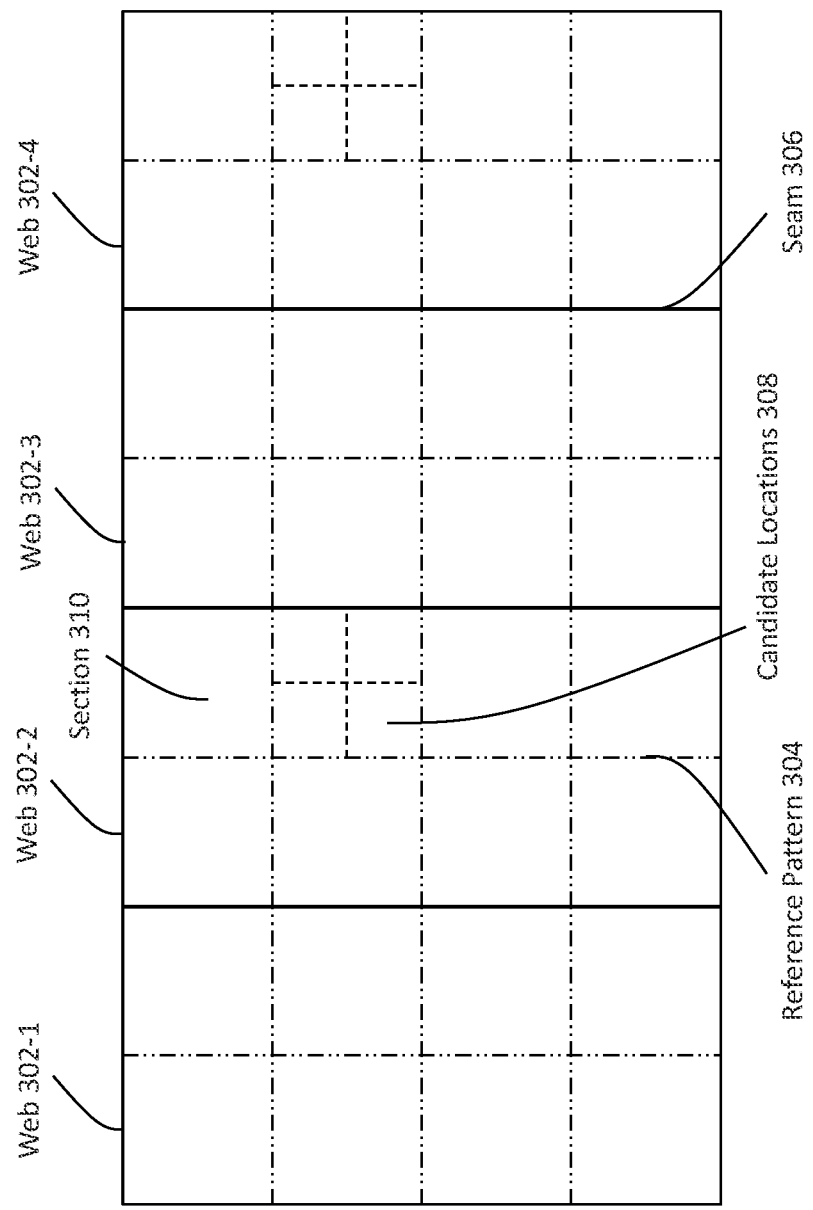
FIG. 3B illustrates an example screen.

FIG. 3B illustrates an example screen (e.g., 314 of FIG. 3A, image display, etc.) that is seamed, stitched and/or welded together with a plurality of webs (e.g., 302-1 through 302-4, etc.). Neighboring webs (e.g., 302-1 and 302-2, 302-2 and 302-3, etc.) in the plurality of webs may be physically joined along seams (e.g., 306, etc.). Each web— e.g., as derived or cut from a roll of a specific screen material, a width of one yard from a roll of a specific screen material, etc.—in some or all of the plurality of webs may be logically partitioned to form a plurality of sections (e.g., 310, etc.) in an overall reference pattern 304. For the purpose of illustration only, the reference pattern (304) may be a rectangular grid pattern. The reference pattern (304) may not be physical but rather logical and thus may not possess visual features visible to a viewer. The reference pattern (304) or the sections (e.g., 310, etc.) therein, may be used as a starting point or an initial condition to generate perforation locations in a semi-random pattern.

As illustrated in FIG. 3B, each section in some or all of the plurality of sections (e.g., 310, etc.) may be further logically (e.g., invisibly, etc.) partitioned into candidate positions (e.g., 308, etc.) some of which may be selected or identified as locations for placing or implementing perforation holes. Perforation locations in the semi-random pattern may be selected, using a perforation generation method as described herein, from a set of candidate positions (e.g., 308, etc.) in the plurality of sections (e.g., 310, etc.) in the reference pattern (304).

A location of a section (e.g., 310, etc.) in the reference pattern (304) may be specified or defined (e.g., with array indexes, with coordinate values, with index values, with row and column values, etc.) in relation to the reference pattern (304), such as an upper left grid point or vertex of the reference pattern (304). Likewise, a perforation location may be specified or defined (e.g., with array indexes, with coordinate values, with index values, with row and column values, etc.) in relation to grid points or vertices of the regular grid pattern (304), such as an upper left grid point or vertex of a section in which the perforation location resides.

For example, a plurality of candidate locations (e.g., 308, etc.) may reside in a section of the reference pattern (304). The section may be one of the plurality of sections (e.g., 310, etc.) that form a two-dimensional (2D) section array as illustrated in FIG. 3B. In some operational scenarios, the location of the section may be specified or defined—in relation to the upper left grid point or vertex of the reference pattern (304)—with section array indexes (or a 2D index, etc.) one of which is along the horizontal direction of the 2D section array and the other which is along the vertical direction of the 2D section array.

A candidate location (e.g., 308, etc.) may be one of a plurality of candidate locations that reside in a section as illustrated in FIG. 3B and form a two-dimensional (2D) candidate location array in the section. The candidate location (e.g., 308, etc.) residing in the section may be identified by the location of the section as specified by the section array indexes of the section plus the (relative) location of the candidate location (e.g., 308, etc.)—in relation to the upper left grid point or vertex of the section—with candidate location array indexes (or a 2D index, etc.) one of which is along the horizontal direction of the 2D candidate location array in the section and the other which is along the vertical direction of the D candidate location array in the section.

Perforation locations can be generated using a perforation generation method as described herein. The perforation locations can be selected, from some or all candidate locations in some or all sections of the reference pattern (304), as a (e.g., proper, etc.) subset of candidate locations in the candidate locations of the reference pattern (304) such that the perforation locations are placed with varying individual spatial displacements in relation to sections (in the reference pattern (304)) in which the perforation locations reside to form a semi-random pattern different from the reference pattern (304).

In some operational scenarios, a perforation generation method as described herein may implement or utilize (e.g., iterative, recursive, etc.) halftone techniques such as Ulichney's void-and-cluster initial pattern (VACip) techniques to generate a semi-random pattern. The halftone techniques may be applied to the entire screen as a whole or a part (e.g., web, a group of contiguous sections on a single fabric web or multiple webs, etc.) thereof individually. These techniques can be used to produce, from candidate locations of the screen or image display, patterns that are spatially random (e.g., as compared with the reference pattern (304), as compared with a regular pattern, etc.). Additionally, optionally or alternatively, these techniques can be implemented to avoid or significantly reduce low frequency patterns that might be observable on the screen as non-uniformity on the screen.

A semi-random perforation pattern generated with halftone techniques provides or maintains uniformity in terms of perforation density (on a screen or image display), the total number of perforations over a unit area (on the screen or image display) comparable or below what the HVS can spatially resolve, and so on. Image rendering operations on the screen or image display with the semi-random perforation pattern so generated produce no or little Moire patterns. In addition, uniform perforation density and corresponding aggregated perforated area on a relatively fine scale—e.g., a unit area comparable to or below what a viewer's vision can spatially resolve, etc.—allow sound from speakers behind the screen to pass with no or little impedance.

Perforation tools used to drill, punch, or otherwise make perforation holes on a screen or a web thereof may be driven with perforation location data specifying perforation locations generated by halftone techniques as described herein.

In some operational scenarios, a perforation generation method as described herein may implement noise generation techniques to generate a semi-random pattern. Noises can be generated with the noise generation techniques and used to modify a reference perforation pattern—which may or may not be the same as the reference pattern of FIG. 3B, etc.—that contains a designated (e.g., uniform, etc.) density of perforation holes—into the semi-random pattern. The reference perforation pattern may be the same as the commercially available Digital Perforation Pattern or another standard perforation pattern such as a regular perforation grid (or a perforation grid of regular pattern), which may be prone to generating Moire patterns in image rendering operations.

More specifically, the noise can be used to generate varying spatial displacements to different locations (e.g., represented with spatial dimensions x and y, etc.) of grid points (or vertices) in the regular perforation grid. The noises can be high frequency noises with a sufficient amount to reduce or avoid Moire patterns but not large enough to increase non-uniformity in perforation hole distribution on the screen.

In some embodiments, the noises may be generated with high pass filtering (e.g., with a two-dimensional filter, with a kernel separable filter, etc.) with a uniform amplitude distribution (e.g., in passed frequencies, with a maximum allowable distance from a reference regular grid point or vertex, with a maximum allowable distance from a reference regular grid line, etc.) to reduce non-uniformity of the semi-random pattern on the screen when viewed at a distance (low pass filtered by the human eye). Amplitudes of the noises along different spatial directions may be different or same. For example, an amplitude of the noises along a spatial axis x may be set differently from or the same as an amplitude of the noises. Additionally, optionally or alternatively, angles of spatial displacements as described herein may be generated or derived from the noises.

Filtering operational parameters (e.g., cutoff frequency, amplitude, filter coefficients, number of filter taps, etc.) for the high pass filtering may be set, selected and/or determined through computer-aided modeling (e.g., MATLAB simulations, etc.) or empirical studies.

For example, the filtering operational parameters may be varied in ranges, values, etc., to determine whether semi-random patterns generated from these varied filtering operational parameters interact with visual content rendered on the screen to generate visually significant Moire patterns. In the meantime, other non-filtering operational parameters such as types and/or sizes of screens, viewing distances, numbers of webs, types of webs, image resolutions (e.g., 4K, 8K, etc.), makers, types and/or models of projectors, densities, sizes and/or shapes of perforation holes, numbers and types of speakers, focusing and/or defocusing of projection lenses, and so on, may be fixed or varied, while values for the filtering operational parameters are being varied and tried, to determine or select optimal values for the filtering operational parameters among the varied and tried values. The optimal values for the filtering operational parameters may generate sufficient noises to avoid or reduce Moire patterns in test images or real images used in optimization operations and to avoid or reduce any non-uniformity that may be introduced by the injection of noises into spatial locations of the perforation holes. Thus, spatial variations and/or noises in spatial locations of perforation holes may be generated and distributed on a screen or image display in a semi-random manner (e.g., with a halftoning or noise injection algorithm with optimized operational parameter values, etc.) as opposed to in a true-random manner.

A semi-random perforation pattern generated with noise generation/injection techniques provides or maintains uniformity in terms of perforation density (on a screen or image display), the total number of perforations over a unit area (on the screen or image display) comparable or below what the HVS can spatially resolve, and so on. Image rendering operations on the screen or image display with the semi-random perforation pattern so generated produce no or little Moire patterns. In addition, uniform perforation density and corresponding aggregated perforated area on a relatively fine scale—e.g., a unit area comparable to or below what a viewer's vision can spatially resolve, etc.—allow sound from speakers behind the screen to pass with no or little impedance.

Perforation tools used to drill, punch, or otherwise make perforation holes on a screen or a web thereof may be driven with perforation location data specifying perforation locations generated by noise generation/injection techniques as described herein.

In some operational scenarios, an amount of noise representing spatial displacements relative to regular grid points (or vertices) in a regular perforation pattern can be controlled to be significantly less than (e.g., ⅛, ¼, ½, etc.) the perforation pitch in the regular perforation pattern. This may be used to reduce or avoid presence of perforation (hole) locations at an edge of a web.

In operational scenarios in which perforation locations are derived based upon a reference grid or pattern such as reference perforation grid, cuts and joins of webs used to combined, seamed, stitched and/or welded into an overall screen (or image display) can be made based upon grid locations represented in the reference grid or pattern without introducing DC shifts (e.g., pitches along a seaming edge of two adjoining webs are shifted by a constant offset, etc.) that affects uniformity of an overall regular pattern of the screen or uniformity of a semi-random pattern of the screen generated from the regular pattern of the screen through noises or varying spatial displacements. As a result, screen materials such as webs can be seamed, stitched and/or welded without producing visible artifacts.

In some operational scenarios, noise generation techniques used to generate a semi-random perforation hole pattern may be modified to reduce the amplitude of noises as one approaches an edge of a web such that locations of perforations trend to a regular perforation pattern—from which the semi-random perforation is generated by varying spatial displacements corresponding to the noises—toward the edge of the web. An extreme example may be to simply cutover to the (original) regular perforation grid toward the edge of the web. In other words, the spatial distribution of perforation holes on the image display screen transits (e.g. continuously) from the semi-random perforation pattern to a regular perforation pattern toward the edge of the web, e.g. at the seam edges. Any of these modifications may be used to prevent creating visible artifacts at the edge of the web when joining with an adjacent web, as both sides of the edge in the web and its adjacent web converges, trends and/or cutover to the same (original pre-modified) regular perforation grid.

Likewise, in some operational scenarios, halftone techniques used to generate a semi-random perforation hole pattern may be modified to reduce the strength of halftone (or dithering) operations as one approaches an edge of a web such that locations of perforations trend to a regular perforation pattern—from which the semi-random perforation is generated by halftoning or dithering—toward the edge of the web. In other words, the spatial distribution of perforation holes on the image display screen transits (e.g. continuously) from the semi-random perforation pattern to a regular perforation pattern toward the edge of the web, e.g. at the seam edges. These modifications may be used to prevent creating visible artifacts at the edge of the web.

In some operational scenarios, halftone techniques may possibly result in incomplete perforations (e.g., half perforations, etc.) along edges of a web among multiple webs seamed, stitched and/or welded into the screen. A halftoning algorithm may use constructs such as circles/spheres to cover neighboring areas when filling voids with perforation holes or avoiding congestion of too many perforations in an existing cluster of perforation holes. For example, the halftoning algorithm may operate to favor placing perforation holes in voids and disfavor placing perforation holes in clusters extending over multiple adjacent areas or regions of a screen. As a result, some perforation holes may be placed by the halftoning algorithm along an edge of two adjoining webs. In practice, half perforation holes or incomplete perforation holes on the two adjoining webs may not be matched exactly, resulting in the half or incomplete perforation holes (e.g., possibly visibly, etc.) appearing along the edge of the webs. In some operational scenarios, injection or generation of noise such as high frequency noise into locations of perforation holes may be constrained so that the perforation holes in a semi-random pattern of a screen as described herein are located within a single web without leaving half or incomplete perforation holes along edges of webs on the screen.

For the purpose of illustration only, it has been described that a screen may be of a rectangular shape. It should be noted, however, that in various embodiments, semi-random perforation hole patterns may be implemented in screens of rectangular or non-rectangular shapes, regular or non-regular shapes, curved or planar shapes, and so forth.

For example, under other approaches, a regular perforation pattern is implemented for or in a curved or domed image display, Moire pattern problems could become pronounced and easily noticeable in certain areas of the curved or domed image display, because of the relatively high likelihood of existence of rational relationships (e.g., similarity, multiplicity, etc.) between spatial frequency responses of the regular perforation pattern and spatial frequencies in visual expressions of the pixels.

In contrast, under techniques as described herein, a semi-random perforation hole pattern ay be implemented with a curved or domed image display in which pixels may not be formed by square-shape screen door (or black strips surrounding pixels in white squares) as illustrated in FIG. 2B but rather may be formed by other shapes of constant or varying sizes depending locations of the pixels on the curved or domed image display. Such a semi-random pattern can be used with the curved or domed image display to lessen or prevent Moire pattern problems, to provide uniformity of perforation holes for sound propagation, to reduce or prevent visual artifacts along edges/seams or elsewhere on the display.

A wide variety of materials may be used (e.g., as webs, etc.) by a screen or image display as described herein. Example materials may include, but are not necessarily limited to only, any of: synthetic materials, plastic or vinyl materials, washable materials, seamed materials, stitched materials, welded materials, materials joined with flat or invisible seams, coated grain screen materials, polarized silver screen materials, laser projection screen materials, woven materials, non-woven materials, random woven materials or materials with random woven patterns, natural or non-natural materials, etc.

Pixel sizes (or sizes of pixels such as white squares of FIG. 2B) of a screen (e.g., a 60-ft screen, a 50-ft screen, a 10-ft screen, etc.) may entirely or partly depend on image resolution of images rendered on the screen and the size of the screen. Perforation sizes and densities may entirely or partly depend on an audio configuration (e.g., speaker configuration, etc.) deployed with the screen (e.g., in FIG. 3A, etc.). Densities and sizes of perforation holes on the screen may be specifically selected to be sufficiently large to allow sound to propagate from speakers behind the screen to viewers/listeners and sufficiently small to make the perforation holes not visually significant or perceivable to the viewers/listeners. In some operational scenarios, pixels on a screen as described herein may have a finer spatial resolution than perforation holes on the screen; for example, pixel sizes may be greater than average spacing or distance between or among the perforation holes. In some operational scenarios, pixels on a screen as described herein may have a coarser spatial resolution than perforation holes on the screen; for example, pixel sizes may be smaller than average spacing or distance between or among the perforation holes. In some operational scenarios, pixels on a screen as described herein may have a comparable spatial resolution to that of perforation holes on the screen.

For the purpose of illustration only, it has been described that a semi-random perforation hole pattern may be generated by either a halftone method or a noise generation/injection method. It should be noted that, in various embodiments, other methods such as a combination of halftone and noise generation methods may be used to generate a semi-random perforation hole pattern. For example, a noise generation/injection method may be applied from a pattern generated from a halftone method instead of a regular grid pattern. Additionally, optionally or alternatively, a halftone method may be applied from a pattern generated from a noise generation/injection method.

5. Example Process Flows

FIG. 4 illustrates an example process flow according to an example embodiment of the present invention. In some example embodiments, a system—which comprises one or more of: computing devices or components, perforation tools, drilling tools, seaming tools, welding tools, stitching tools, screen material assembly tools, image processing systems, image projectors, audio systems, etc.—may perform this process flow. In block 402, the system applies one or more perforation hole pattern methods to generate a spatial distribution of perforation holes forming a semi-random pattern for an image display screen to reduce Moire patterns. The semi-random pattern represents a spatially random perforation pattern free of relatively low frequency patterns prone to generate the Moire patterns in the image rendering operations. As used herein, "low frequency", "relatively low frequency," "low spatial frequency", "relatively low spatial frequency," and so forth, refer to spatial frequencies in or toward the lower part of a full spatial frequency spectrum visually perceptible to HVS. Alternatively or equivalently, "low frequency", "relatively low frequency," "low spatial frequency", "relatively low spatial frequency," and so forth, may refer to spatial frequencies (e.g., spatial frequencies in a semi-random perforation patter, etc.) that form rational relationships such as comparable to or multiple of spatial frequencies in image features of rendered images thereby generating Moire patterns in image rendering operations. Conversely, "high frequency", "relatively high frequency," "high spatial frequency", "relatively high spatial frequency," and so forth, refer to spatial frequencies in or toward the upper part of a full spatial frequency spectrum visually perceptible to HVS. Alternatively or equivalently, "high frequency", "relatively high frequency," "high spatial frequency", "relatively high spatial frequency," and so forth, may refer to spatial frequencies (e.g., spatial frequencies in a semi-random perforation patter, etc.) that do not form rational relationships such as comparable to or multiple of spatial frequencies in image features of rendered images thereby avoiding or reducing Moire patterns in image rendering operations.

In block 404, the system perforates the image display screen with the spatial distribution of perforation holes forming the semi-random pattern. In block 406, the system emits, by a light projector, image rendering light toward the image display screen that is installed in an image rendering environment.

In block 408, the system reflects, by the image display screen, at least a portion of the image rendering light emitted from the light projector toward a viewer.

Blocks 402 and 406 without blocks 406 and 408 represent the steps of a method of manufacturing an image display screen. Such method of manufacturing the image display screen may further comprise (not shown in FIG. 4) the additional step of providing a plurality of webs that are joined along one or more seam edges of the image display screen. The spatial distribution of perforation holes on the image display screen trends to or cuts over from a semi-random perforation pattern to a regular perforation pattern toward the one or more seam edges.

In an embodiment, an image display system comprises: an image display screen that comprises a spatial distribution of perforation holes forming a semi-random pattern; a light projector that emits image rendering light toward the image display screen. The image display screen reflects at least a portion of the image rendering light emitted from the light projector toward a viewer.

In an embodiment, the semi-random pattern is a two-dimensional pattern generated from applying halftoning techniques over one or more regions of the image display screen.

In an embodiment, the semi-random pattern is a two-dimensional pattern generated from applying noise injection techniques over one or more regions of the image display screen.

In an embodiment, the semi-random pattern is a two-dimensional pattern generated from applying a combination of two or more semi-random pattern generation techniques over one or more regions of the image display screen; the combination of two or more semi-random pattern generation techniques include one or more of: halftoning techniques, noise injection techniques, dithering techniques, or other pattern generation techniques.

In an embodiment, the viewer is in front of the image display screen; wherein the image display system operates in conjunction with a set of audio speakers behind the image display screen; the set of audio speakers concurrently generate sounds that propagate toward the viewer through the perforation holes of the image display screen.

In an embodiment, the image display system operates in one of: a cinema, a theatre, an amusement park, an exhibition hall, a home setting, a bar, a club, or another venue.

In an embodiment, the viewer is located beyond a designated viewing distance.

In an embodiment, the spatial distribution of perforation holes on the image display screen is uniform for an area of a dimension that is visually resolvable by the viewer located at a designated viewing distance from the image display screen.

In an embodiment, the semi-random pattern is less prone than a regular perforation pattern to generate Moire patterns in image rendering operations.

In an embodiment, the image display screen comprises a plurality of seams that are joined along one or more seam edges.

In an embodiment, the spatial distribution of perforation holes on the image display screen trends to a regular perforation pattern at the one or more seam edges.

In an embodiment, the spatial distribution of perforation holes on the image display screen cuts over to a regular perforation pattern at the one or more seam edges.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for control ling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of some embodiments include the following enumerated example embodiments (EEEs):

EEE1. An image display system comprising:
  an image display screen that comprises a spatial distribution of perforation holes forming a semi-random pattern to reduce Moire patterns in image rendering operations;
  wherein the semi-random pattern represents a spatially random perforation pattern free of relatively low frequency patterns prone to generate the Moire patterns in the image rendering operations;
  a light projector configured to emit image rendering light toward the image display screen;
  wherein the image display screen is configured to reflect at least a portion of the image rendering light emitted from the light projector toward a viewer.

EEE2. The image display system of EEE1, wherein the semi-random pattern is a two-dimensional pattern generated from applying halftoning techniques over one or more regions of the image display screen.

EEE3. The image display system of EEE1, wherein the semi-random pattern is a two-dimensional pattern generated from applying noise injection techniques over one or more regions of the image display screen.

EEE4. The image display system of EEE1, wherein the semi-random pattern is a two-dimensional pattern generated from applying a combination of two or more semi-random pattern generation techniques over one or more regions of the image display screen; wherein the combination of two or more semi-random pattern generation techniques include one or more of: halftoning techniques, noise injection techniques, dithering techniques, or other pattern generation techniques.

EEE5. The image display system of any one of EEEs 1 to 4, wherein the viewer is in front of the image display screen; wherein the image display system is configured to operate in conjunction with a set of audio speakers behind the image display screen; wherein the set of audio speakers is configured to concurrently generate sounds that propagate toward the viewer through the perforation holes of the image display screen.

EEE6. The image display system of any one of EEEs 1 to 5, wherein the image display system operates in one of: a cinema, a theatre, an amusement park, an exhibition hall, a home setting, a bar, a club, or another venue.

EEE7. The image display system of any one of EEEs 1 to 6, wherein the viewer is located beyond a designated viewing distance.

EEE8. The image display system of any one of EEEs 1 to 7, wherein the spatial distribution of perforation holes on the image display screen is uniform for an area of a dimension that is visually resolvable by the viewer located at a designated viewing distance from the image display screen.

EEE9. The image display system of any one of EEEs 1 to 8, wherein the semi-random pattern is less prone than a regular perforation pattern to generate Moire patterns in image rendering operations.

EEE10. The image display system of any one of EEEs 1 to 9, wherein the image display screen comprises a plurality of webs that are joined along one or more seam edges.

EEE11. The image display system of EEE10, wherein the spatial distribution of perforation holes on the image display screen trends to a regular perforation pattern at the one or more seam edges.

EEE12. The image display system of EEE 10, wherein the spatial distribution of perforation holes on the image display screen cuts over to a regular perforation pattern at the one or more seam edges.

EEE13. A method, the method comprising:
  applying one or more perforation hole pattern methods to generate a spatial distribution of perforation holes forming a semi-random pattern for an image display screen to reduce Moire patterns in image rendering operations;
  wherein the semi-random pattern represents a spatially random perforation pattern free of relatively low frequency patterns prone to generate the Moire patterns in the image rendering operations;
  perforating the image display screen with the spatial distribution of perforation holes forming the semi-random pattern;
  emitting, by a light projector, image rendering light toward the image display screen that is installed in an image rendering environment;
  reflecting, by the image display screen, at least a portion of the image rendering light emitted from the light projector toward a viewer.

EEE14. A non-transitory computer readable storage medium, storing software instructions, which when executed by one or more processors cause the method recited in EEE 13 to be performed.

EEE15. An apparatus comprising one or more processors and one or more storage media, storing a set of instructions, which when executed by one or more processors cause the method recited in EEE 13 to be performed.

The invention claimed is:

1. An image display screen comprising:
    a spatial distribution of perforation holes forming a semi-random pattern to reduce Moire patterns in image rendering operations;
    wherein the image display screen is configured to reflect at least a portion of image rendering light emitted from a light projector toward a viewer;
    wherein the image display screen comprises a plurality of webs that are joined along one or more seam edges; and
    wherein the spatial distribution of perforation holes on the image display screen trends from the semi-random pattern to a regular perforation pattern toward the one or more seam edges.

2. The image display screen of claim 1, wherein the semi-random pattern is a two-dimensional pattern generated from applying halftoning techniques over one or more regions of the image display screen.

3. The image display screen of claim 1, wherein the semi-random pattern is a two-dimensional pattern generated from applying noise injection techniques over one or more regions of the image display screen.

4. The image display screen of claim 1, wherein the semi-random pattern is a two-dimensional pattern generated from applying a combination of two or more semi-random pattern generation techniques over one or more regions of the image display screen; wherein the combination of two or more semi-random pattern generation techniques include one or more of: halftoning techniques, noise injection techniques, dithering techniques, or other pattern generation techniques.

5. The image display screen of claim 1, wherein the viewer is in front of the image display screen; wherein the image display screen is configured to operate in conjunction with a set of audio speakers behind the image display screen; wherein the perforation holes of the image display screen are configured to allow sounds generated by the set of audio speakers to pass through the image display screen toward the viewer.

6. The image display screen of claim 1, configured to operate in one of: a cinema, a theatre, an amusement park, an exhibition hall, a home setting, a bar, a club, or another venue.

7. The image display screen of claim 1, wherein the viewer is located beyond a designated viewing distance from the image display screen.

8. The image display screen of claim 1, wherein the spatial distribution of perforation holes on the image display screen is uniform for an area of a dimension that is visually resolvable by the viewer located at a designated viewing distance from the image display screen.

9. The image display screen of claim 1, wherein the semi-random pattern is less prone than a regular perforation pattern to generate Moire patterns in image rendering operations.

10. A method of manufacturing an image display screen, comprising:
    applying one or more perforation hole pattern methods to generate a spatial distribution of perforation holes forming a semi-random pattern for the image display screen to reduce Moire patterns in image rendering operations;
    perforating the image display screen with the spatial distribution of perforation holes forming the semi-random pattern;
    providing a plurality of webs that are joined along one or more seam edges of the image display screen;
    wherein the spatial distribution of perforation holes on the image display screen trends from the semi-random pattern to a regular perforation pattern toward the one or more seam edges.

11. The method of claim 10, wherein the semi-random pattern is a two-dimensional pattern generated from applying halftoning techniques over one or more regions of the image display screen.

12. The method of claim 10, wherein the semi-random pattern is a two-dimensional pattern generated from applying noise injection techniques over one or more regions of the image display screen.

13. The method of claim 10, wherein the semi-random pattern is a two-dimensional pattern generated from applying a combination of two or more semi-random pattern generation techniques over one or more regions of the image display screen; wherein the combination of two or more semi-random pattern generation techniques include one or more of: halftoning techniques, noise injection techniques, dithering techniques, or other pattern generation techniques.

14. The method of claim 10, wherein a viewer is in front of the image display screen; wherein the image display screen is configured to operate in conjunction with a set of audio speakers behind the image display screen; and wherein the perforation holes of the image display screen are configured to allow sounds generated by the set of audio speakers to pass through the image display screen toward the viewer.

15. The method of claim 10, wherein the image display screen operates in one of: a cinema, a theatre, an amusement park, an exhibition hall, a home setting, a bar, a club, or another venue.

16. The method of claim 10, wherein a viewer is located beyond a designated viewing distance from the image display screen.

17. The method of claim 10, wherein the spatial distribution of perforation holes on the image display screen is uniform for an area of a dimension that is visually resolvable by a viewer located at a designated viewing distance from the image display screen.

18. The method of claim 10, wherein the semi-random pattern is less prone than a regular perforation pattern to generate Moire patterns in image rendering operations.

* * * * *